July 5, 1938.  W. J. MADDEN  2,123,076
AIR CONDITIONING APPARATUS FOR PASSENGER CARS
Filed Sept. 5, 1935  4 Sheets-Sheet 4
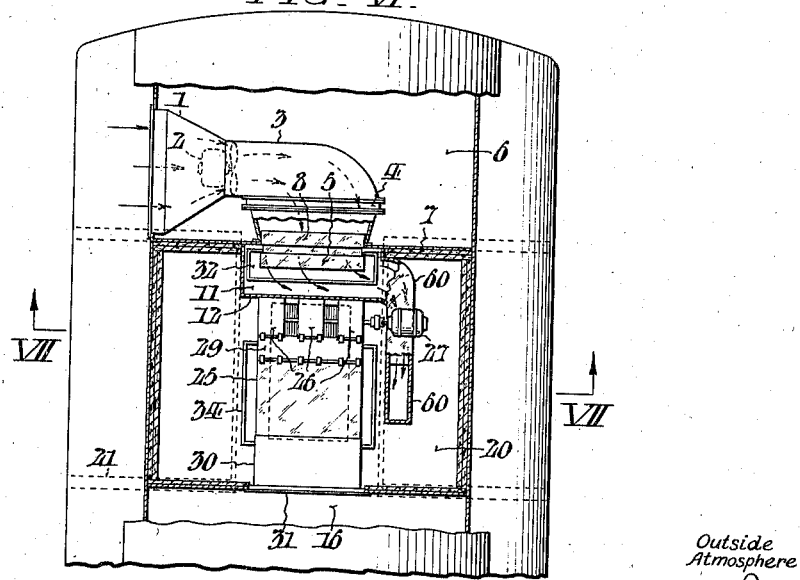
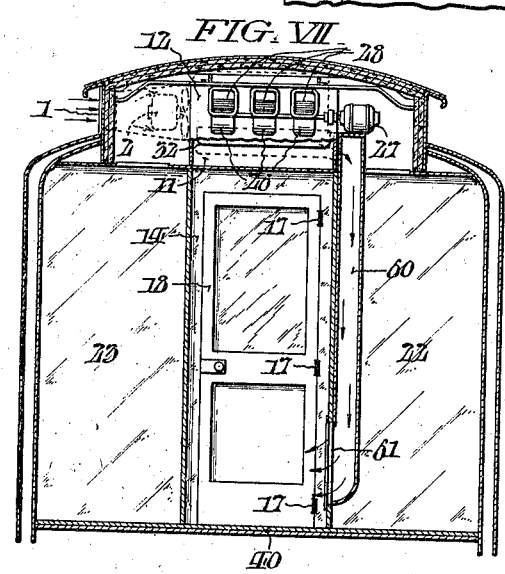
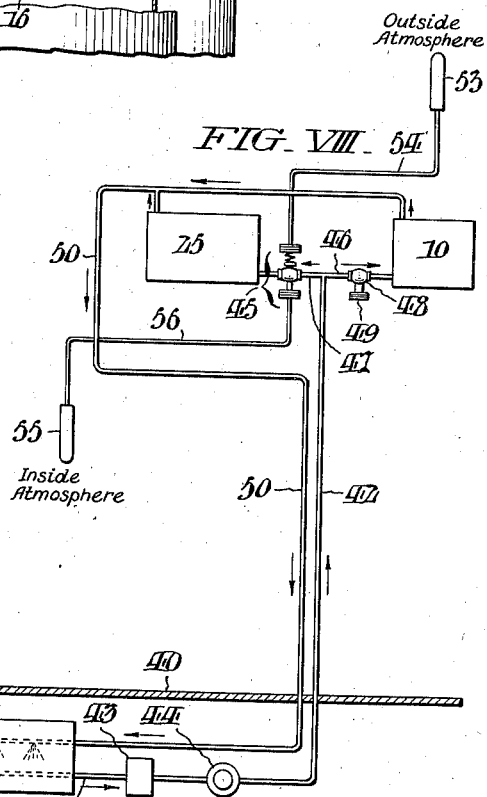
INVENTOR:
William J. Madden,
BY
ATTORNEYS.

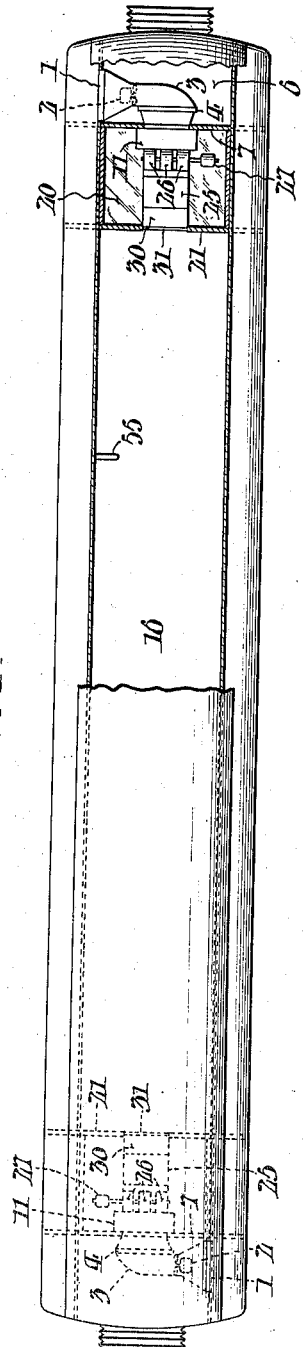

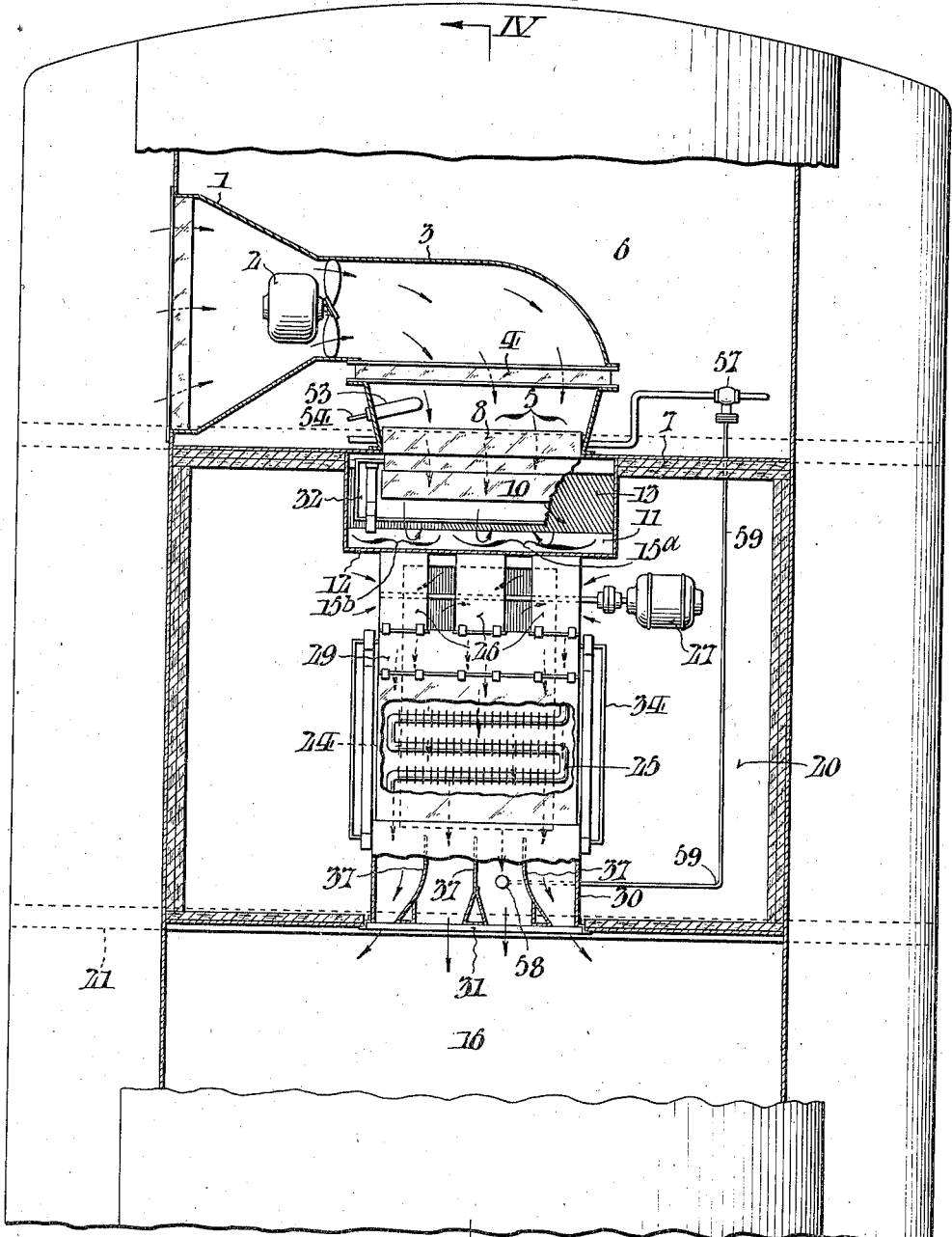

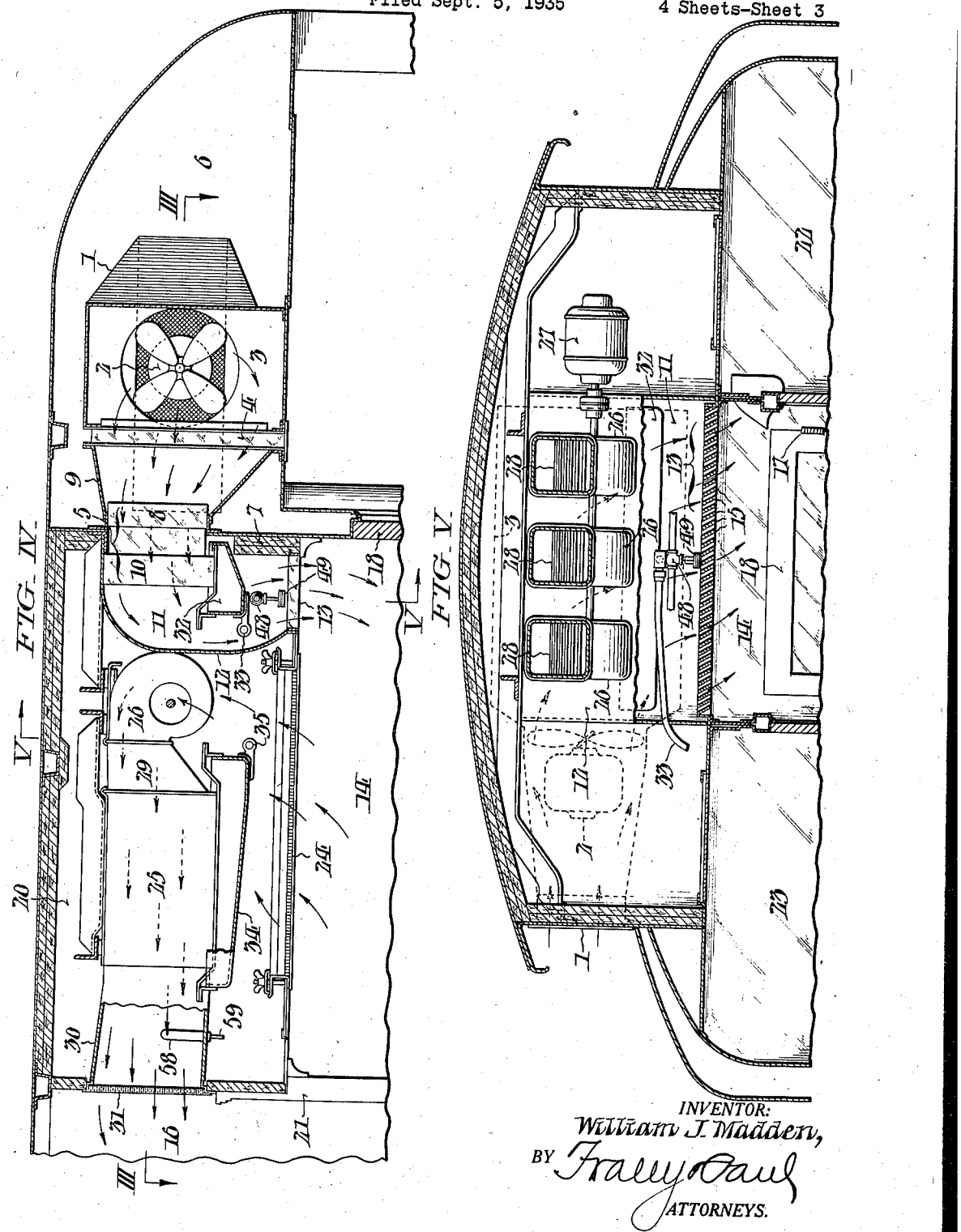

Patented July 5, 1938

2,123,076

UNITED STATES PATENT OFFICE 2,123,076

AIR CONDITIONING APPARATUS FOR PASSENGER CARS

William J. Madden, Lansdowne, Pa., assignor to The Pennsylvania Railroad Company, Philadelphia, Pa., a corporation of Pennsylvania Application September 5, 1935, Serial No. 39,291

4 Claims. (Cl. 62—129)

This invention relates to conditioning air in railway passenger cars, and has for its general object the provision of an improved system of air distribution, an improved method of humidity control, and the use of apparatus capable of efficient and economical operation.

It is well recognized that in systems for conditioning air in railway passenger cars which involve sealing the car windows, it is difficult to maintain a uniform temperature throughout all regions of the passenger space, there being a tendency for the ends of the car to be somewhat warmer than the central region thereof in the summer season and somewhat cooler than the central region of the car in the winter season. One obvious reason for this is that the doors at the ends of the car are subject to frequent opening and closing, which makes it impossible to form an effective seal against the admission of unconditioned air from the outside atmosphere into the end regions of the car.

One object of the present invention is to provide a more uniform temperature throughout the entire length of the passenger space, and this is accomplished by the use of air conditioning equipment which in the summer season admits definite quantities of relatively cold air to the ends of the car, and in the winter season admits definite quantities of warm air to the ends of the car, in addition to its function of recirculating and replenishing the air of the passenger space under temperature and humidity control.

With air conditioning systems heretofore proposed for passenger cars, it has also been found difficult to maintain uniform conditions of humidity and temperature by reason of the fact that the control of such factors has been accomplished by varying the quantities of fresh air admitted from the atmosphere, or the quantities of air of the passenger space caused to be reconditioned and recirculated. One important object of the present invention is to obtain the desired control of temperature and humidity without varying the quantity of fresh air admitted to the car, and without varying the quantity of air from the passenger space which is recirculated and reconditioned. For this purpose the apparatus of the present invention is characterized by the provision of two independent heat transfer units, one for the incoming fresh air, and one for the recirculated air, each unit having its own independent and continuously running fan.

A further object of the invention is to provide not only for continuous admission and recirculation of definite quantities of air, but additionally to utilize a continuously running pump for supplying refrigerant to the heat transfer units, the desired refrigerating effect being obtained by varying the relative proportions of the refrigerant supplied to each of the two independent heat transfer units. In this manner, there is gained a substantial saving in the maintenance of the electrical apparatus. Moreover, the use of two independent cooling units of the character indicated materially improves the humidity control and the freshness of the air in the car, for the amount of fresh air taken in from the atmosphere is maintained substantially constant at all times.

Other objects and advantages characterizing the air conditioning apparatus of this invention will be more fully apparent from the description hereinafter set forth of an example or embodiment of the invention in a railway car, having reference to the accompanying drawings. Of the drawings:

Fig. I represents a plan view of a car with portions of the roof cut away to reveal the general location of the air conditioning equipment.

Fig. II represents a side elevation of the car with one-half of it shown in cross section, and shows generally the path of the currents of air through the conditioning units and the passenger space.

Fig. III represents an enlarged plan view of one end of the car with portions of the roof and other parts cut away to show details of the air conditioning equipment.

Fig. IV represents a longitudinal cross section of the same, taken as indicated by the lines IV—IV of Fig. III.

Fig. V represents a transverse cross section of the apparatus shown in Fig. IV, taken as indicated by the lines V—V thereof.

Fig. VI represents a plan view of one end of the car, showing a modification of the invention involving the provision of a vertical duct for conveying the incoming fresh air from the top of the car to a point near the floor thereof.

Fig. VII represents a cross section of the modified form of apparatus, taken as indicated by the lines VII—VII of Fig. VI; and Fig. VIII represents diagrammatically the system employed for the circulation of refrigerant through the conditioning units.

With reference particularly to Figs. I and II, there is represented an ordinary railway car equipped at each end with air conditioning apparatus, the apparatus at one end of the car being in all respects similar to the apparatus at the opposite end. The description hereinafter of the component parts of the air conditioning apparatus will be confined to the equipment employed at one end of the car, it being understood that this equipment is preferably, though not essentially, duplicated at the opposite end.

Desirably, the car windows are sealed and fresh air from the atmosphere is admitted to the car through an intake 1 located in the upper region of the end of the car. As shown in Figs. III and IV, a fan 2 is disposed within the intake 1, and air is discharged from the fan through a duct 3 having therein a filter 4 and an extension 9 leading to a heat transfer or conditioning unit 5. Desirably, the above mentioned parts are disposed within a compartment 6 located above the exterior vestibule of the car, with the conditioning unit 5 situated in the vicinity of the car end wall 7. The conditioning unit 5 includes a surface cooler 10 and desirably, also, a heater 8 placed in the path of the incoming fresh air, the heater 8 being adapted for use during the winter season when the cooler 10 is not in operation. The duct 3 is so designed that all of the incoming fresh air is conducted through the heater 8 and the cooler 10. Air discharged from the conditioning unit 5 is conducted through a chamber 11 bounded by the end walls 7 and a partition plate 12, and is then directed downwardly through a grille 13 into the vestibule passageway 14. The grille 13 preferably comprises a series of deflecting baffles 15, the arrangement of which is shown most clearly in Figs. III and V, inclined at such an angle as to cause the air discharging from the chamber 11 to be deflected toward one side of the passageway 14, as well as to be deflected in the general direction of the passenger space 16 of the car. The particular arrangement of the baffles 15 avoids a down draft of air at that side of the passageway 14 at which people enter the car,—the side away from the hinges 17 of the door 18. As shown in Fig. III, the baffles of the group designated at 15a are disposed diagonally as viewed from above, tending to deflect the air toward the passenger space 16, whereas the remaining baffles designated at 15b are disposed parallel to the longitudinal axis of the car, permitting the air passing therethrough to flow downwardly towards the lower region of the passageway 14. All of the baffles 15 are inclined, as viewed in side elevation and as shown in Fig. V, in such manner as to deflect the air away from the heads of passengers entering the passageway 14.

Above the vestibule passageway 14, there is an additional compartment 20 extending longitudinally from the car end wall 7 to the usual partition wall 21 which separates the passenger space from the vestibule passageway 14 and the rooms 22, 23 at each side thereof. At the bottom of the compartment 20, there is a grille 24, shown most clearly in Fig. IV, through which air from the passenger space is drawn for recirculation and reconditioning by a second conditioning unit 25, having a surface cooler therein, through which a refrigerant is circulated in the summer season. Air is drawn through the grille 24 by means of a fan 26 operated by a motor 27. In the present example, the fan 26 comprises three separate rotors 28, from each of which air is discharged through a duct 29 to the conditioning unit 25. Air thus forced through the conditioning unit 25 passes through a duct 30 and an outlet grille 31, disposed at the partition 21, into the passenger space 16. This body of air is then urged along the roof of the car in a longitudinal direction in parallel turbulent streams. It will be noted that the compartment 20 is separated from the fresh air chamber 11 by the partition 12, so that each conditioning unit 5, 25 is independent of the other. In the illustrated example, there is associated with the fresh air cooler 10 a drip pan 32 having a drain pipe 33, and similarly there is associated with the recirculated air cooler of the conditioning unit 25 a like form of drip pan 34 and drain pipe 35. Rearwardly of the outlet grille 31, as clearly shown in Fig. III, baffles 37 are provided for causing the air to issue from the grille 31 in a relatively broad stream and to be well distributed throughout the upper region of the passenger space.

Both the fan 2 at the fresh air intake 1, and the fan 26 in the compartment 20, are operated continuously and at a constant speed. Accordingly, at all times there is drawn into the car a substantially constant quantity of fresh air, and this air is cooled in the summer season and admitted to the end of the passenger space where the temperature tends to rise above that obtained in the central region of the passenger space. The fresh air thus admitted follows generally the path indicated by the arrows in Fig. II, and its relatively cold temperature compensates for the differences in temperature which ordinarily exists between the ends and the central region of the passenger space.

Air from the interior passenger space 16 is continuously withdrawn by means of the fan 26 and carried rearwardly to the vestibule passageway 14 and then upwardly through the grille 24 into the compartment 20. From thence it is drawn by the fan 26 through the duct 29 into the conditioning unit 25. In the summer season it is there cooled to the desired temperature, and returned through the outlet grille 31 back to the passenger space 16 in parallel turbulent streams. The air thus continuously recirculated and reconditioned is substantially constant in quantity.

In order to gain the proper temperature and humidity control, the refrigerant system for the conditioning units 5, 25 is desirably of the character represented in Fig. VIII. As there shown, there is disposed beneath the floor 40 a relatively large bunker 41 which may contain cubes of ice or other means for cooling the medium supplied to the conditioning units 5, 25. From the bunker 41 a supply line 42 leads through a strainer 43 and a continuously running pump 44 and then divides into two branches 46 and 47, leading respectively to the cooler 10 and to the conditioning unit 25. In the branch 46 of the supply line, there is a valve 48 operated by means of a thermostat 49. In the branch 47 there is a valve 45 operated by a differential thermostat. The refrigerant medium discharged from the cooling units passes into a common discharge line 50 which leads back to the bottom of the car, and into the bunker 41 where it may terminate in a spray pipe 51. The differential thermostatic control device for operating the valve 45 is preferably of the type disclosed and described in detail in U. S. Letters Patent No. 1,975,165, granted to me on October 2, 1934. This device serves to control the rate of flow of the refrigerant medium to the conditioning unit 25 within certain limits which are dependent upon the difference between the inside and outside temperature of the car.

The thermostatic control includes a temperature responsive element 53 exposed to the outside atmosphere and connected to mechanism associated with the valve 45 by a tube 54, and an additional temperature responsive element 55 exposed to the interior of the passenger space and desirably located about one quarter of the length of the passenger space away from the partition 21 and connected to mechanism associated with the valve 45 by a tube 56. The additional thermostat 49 serves to vary the proportion of the total quantity of circulated refrigerant which is supplied to the cooler 10. In an obvious manner, the position of the valves 45 and 48 determines the relative amounts of refrigerant supplied to the cooler 10 and to the conditioning unit 25. The thermostat 49 for operating the valve 48 is preferably disposed within the chamber 11 at the discharge side of the conditioning unit 5, as shown most clearly in Fig. IV. Thus the thermostat 49 operates in response to the temperature of the incoming fresh air. Moreover, the apparatus is so regulated that the incoming fresh air will be cooled to a predetermined temperature, say 50° to 55° F., prior to discharge into the vestibule passageway 14.

On account of the fresh air being received into the car at the vestibule passageway 14, where people do not stand except for short periods, it is permissible to cool this air down to a relatively low temperature and thus obtain substantial dehumidification. I have found that if this air is cooled to temperatures below 50° F. or thereabouts, the additional dehumidifying effect is relatively small and the effort to gain it is uneconomical, as well as unnecessary. Moreover, if the incoming fresh air is not cooled to the neighborhood of 55° F. or lower, it is found that the air in the passenger space has a higher relative humidity than that desired for maximum comfort. Under ordinary conditions, the human body is most comfortable when surrounded by air at a relative humidity of approximately 50%. By cooling the incoming fresh air in the first conditioning unit 5 to temperatures substantially within the range noted above, sufficient moisture is removed from the incoming air to maintain the desired relative humidity in the passenger space with economy of operation.

In the winter season the operation of the conditioning equipment is exactly the same insofar as the circulation of air is concerned. Both the fan 2 at the fresh air intake 1 and the fan 26 in the compartment 20 are operated continuously at a constant speed. The fresh air passing through the conditioning unit 5 is heated by the heater 8 prior to discharge through the grille 13. Air from the interior passenger space 16 is continuously withdrawn by means of the fan 26 and carried rearwardly to the vestibule passageway 14 and then upwardly through the grille 24 into the compartment 20. The cooling elements are inoperative in the winter season and the conditioning unit 25, which is constructed in the form of a radiator having relatively large heat exchanging surfaces, serves then in the capacity of a heat absorber. The large metal surfaces tend to absorb and dissipate heat in such manner as to equalize or temper the air passing therethrough. Sudden temperature changes are thus avoided.

For regulating the supply of steam or other suitable heating medium to the heater 8, there is employed a valve 57 controlling the supply of the heating medium to the heater and a temperature responsive element 58 disposed at the outlet end of the conditioning unit 25 and connected by a tube 59 to mechanism for operating the valve 57.

In Figs. VI and VII, there is shown a slightly modified form of my invention in which parts similar to those already described are referred to by the same reference numerals. The principal change represented in the modified form of apparatus involves the use of a duct 60 (in lieu of the grille 13 hereinbefore described) which leads from the discharge side of the conditioning unit 5 and carries the fresh air from the atmosphere laterally across the chamber 11 above the passageway 14, and then downwardly to a point near the floor of the car. The duct 60 is desirably located within the room 22 adjoining the vestibule passageway 14 and it terminates in an outlet 61 which discharges into the passageway near the bottom thereof. The operation of the modified form of apparatus is in all respects similar to the operation of the apparatus hereinbefore described, except that the incoming fresh air after cooling or heating is discharged at a relatively low level towards the passenger space.

It will be apparent that both forms of apparatus shown in the drawings involve the use of independent heat transfer units and the use of continuously operating fans, and a continuously operating pump for the circulation of the refrigerant, and this renders the operation of the air conditioning equipment particularly efficient and economical, effecting a substantial saving especially in the electrical control apparatus. Furthermore, all parts of the car are maintained at the desired uniform temperature, which in the summer season is made dependent in part upon the temperature of the outside atmosphere, and calculated to produce the maximum human comfort. The control of the humidity of the air in the car is improved by reason of the fact that definite quantities of atmospheric air are continuously admitted to the interior of the car, and definite quantities of air from the discharge space are continuously recirculated and reconditioned.

While I have described my invention with reference to a particular form of apparatus incorporated within a particular type of railway car, and a modification thereof, it will be apparent that various changes may be made in the form of the apparatus herein described and its mode of operation, all without departing from the spirit of the invention as defined in the annexed claims.

Having thus described my invention, I claim:

1. Apparatus for conditioning air in a railway passenger car comprising two separate cooling compartments disposed near the top of the car at one end thereof, each compartment having a cooling unit therein, means for continuously drawing air from the exterior of the car and passing it exclusively into one of said compartments through the cooling unit thereof and discharging it downwardly through the vestibule passageway of the car into the passenger space, means for continuously withdrawing air from the passenger space and passing it exclusively through the other compartment and its cooling unit and returning it to the passenger space along the top thereof, and means for circulating a refrigerant through each of said cooling units.

2. Apparatus for conditioning air in a railway passenger car comprising two separate cooling compartments disposed near the top of the car at one end thereof, each compartment having a cooling unit therein, means for continuously drawing air from the exterior of the car and passing it exclusively into one of said compartments through the cooling unit thereof and discharging it downwardly into the vestibule passageway of the car, deflecting means whereby said air is discharged toward one side of said passageway as well as toward the passenger space, means for continuously withdrawing air from the passenger space and passing it exclusively through the other compartment and its cooling unit and returning it to the passenger space along the top thereof, and means for circulating a refrigerant through each of said cooling units.

3. Apparatus for conditioning air in a railway passenger car comprising two separate conditioning units disposed near the end of the car, means for continuously drawing air from the exterior of the car and passing said air exclusively through one of said conditioning units and discharging it directly into the passageway at the end of the car, separate means for continuously withdrawing air from the passenger space and passing said air exclusively through the other conditioning unit and returning it in parallel turbulent streams to the passenger space along the roof of the car, means for circulating a heat exchange medium through each of said conditioning units, and means for varying the relative conditioning effects of said conditioning units whereby substantially uniform temperature is provided through the length of the passenger space.

4. Apparatus for conditioning air in a railway passenger car comprising two separate cooling units disposed near the top of the car at one end thereof, means for continuously drawing constant quantities of air from the exterior of the car and passing said air exclusively through one of said cooling units and discharging it downwardly into the end of the car at a relatively low level, separate means for continuously withdrawing constant quantities of air from the passenger space and passing said air exclusively through the other cooling unit and returning it to the passenger space at a relatively high level, means for circulating a refrigerant through each of said cooling units, and means for varying the refrigerating effects of said cooling units whereby substantially uniform temperature is provided through the length of the passenger space.

WILLIAM J. MADDEN.